(12) United States Patent
Huang et al.

(10) Patent No.: US 8,171,271 B2
(45) Date of Patent: May 1, 2012

(54) SERVER DEVICE AND METHOD OF SHARING BASIC INPUT/OUTPUT SYSTEM

(75) Inventors: Kuo-Wei Huang, Taipei (TW);
Ting-Shun Huang, Taipei (TW)

(73) Assignee: Inventec Corporation, Taipei (TW)

( * ) Notice: Subject to any disclaimer, the term of this patent is extended or adjusted under 35 U.S.C. 154(b) by 882 days.

(21) Appl. No.: 12/144,900

(22) Filed: Jun. 24, 2008

(65) Prior Publication Data

US 2009/0276614 A1 Nov. 5, 2009

(30) Foreign Application Priority Data

May 2, 2008 (TW) .............................. 97116248 A

(51) Int. Cl.
*G06F 9/24* (2006.01)
*G06F 15/177* (2006.01)

(52) U.S. Cl. ................. 713/1; 713/2; 713/100; 717/168
(58) Field of Classification Search .................. 713/1, 2, 713/100; 717/168
See application file for complete search history.

(56) References Cited

U.S. PATENT DOCUMENTS

| 7,962,735 B2* | 6/2011 | Huang et al. ...................... 713/1 |
| 2004/0254937 A1* | 12/2004 | Gernold .......................... 707/10 |
| 2006/0130046 A1* | 6/2006 | O'Neill ........................ 717/168 |
| 2007/0186086 A1* | 8/2007 | Lambert et al. .................... 713/1 |
| 2008/0270411 A1* | 10/2008 | Sedukhin et al. ............... 707/10 |

\* cited by examiner

*Primary Examiner* — Kim Huynh
*Assistant Examiner* — Michael J Brown
(74) *Attorney, Agent, or Firm* — James W. Huffman

(57) ABSTRACT

A server device and a method of sharing a basic input/output system (BIOS) include a plurality of mainboards, a circuit board, and a memory unit, and a switching unit disposed on the circuit board. A single memory unit stores a plurality of BIOS entity program segments respectively corresponding to a mainboard model, and transmits the BIOS entity program segments corresponding to the model of the mainboard for receiving the BIOS to the mainboard through the switching unit, so that the mainboards of various models may share the BIOS.

13 Claims, 5 Drawing Sheets

SERVER DEVICE AND METHOD OF SHARING BASIC INPUT/OUTPUT SYSTEM

CROSS-REFERENCE TO RELATED APPLICATIONS

This non-provisional application claims priority under 35 U.S.C. §119(a) on Patent Application No(s). 097116248 filed in Taiwan, R.O.C. on May 2, 2008 the entire contents of which are hereby incorporated by reference.

BACKGROUND OF THE INVENTION

1. Field of Invention

The present invention relates to a server device, in particularly, to a server device and a method of sharing BIOS.

2. Related Art

A common personal computer (PC) can only be operated by a single user at one time. Therefore, a computer capable of supporting multiple users at the same time and having high computation ability has been developed, which is named server. The server is operated by multiple clients over the network.

A conventional tower server has a large volume and occupies much space. When an enterprise needs a server system consisting of multiple servers, a considerably large space is necessary for accommodating the entire hardware architecture.

Then, a rack mount server system is developed, in which several server mainframes with the height of 1U (i.e., 4.445 cm) are placed on a single cabinet for centralized management. Compared with the tower server system, the rack mount server system occupies less space and is arranged more orderly. The rack mount server system is commonly seen in a computer center.

In recent years, the rack mount server system is further progressed into a blade server system, which saves much more space than the rack mount server system, and is suitable for occasions with limited space, such as offices, and is more suitable for commercial economy.

In the blade server system, multiple single board server mainframes (i.e., the mainboards) are integrated into a single casing through a complete pedestal (also called a blade pedestal). The pedestal provides the functions of power supply, heat dissipation of fan, and network communication in a centralized management manner. The mainboards are inserted into the pedestal, and the entire hardware architecture looks like a blade, so the hardware architecture is named a blade server system. In the blade server system, all the server mainframes may share the resources, such as a power supply, a display, an input device, and a network environment. Therefore, the blade server mainframe needs fewer elements such as power supplies and fans than the environment using the multiple rack mount server systems or tower server systems. Since the number of the internal elements in the machine is reduced, the power consumption is greatly reduced accordingly. Furthermore, customized functions may be provided in response to the clients' requirements without changing the whole system.

A basic input/output system (BIOS) is the most basic firmware program codes stored in the computer hardware, and mainly used for Power-On Self Test (POST), initialization, recording system settings, providing a routine library, and loading an operating system. The BIOS is a micro operating system in communication with the hardware.

At present, in a blade server system, each of the mainboards is equipped with a Read Only Memory (ROM), so as to store the BIOS used for booting.

In order to update the BIOS, the mainboard of the BIOS to be updated must be started to execute a BIOS update procedure on its ROM. However, to update all BIOS of the mainboards in the blade server system is time-consuming and has a low efficiency.

SUMMARY OF THE INVENTION

In order to solve the problems in the prior art, the present invention provides a server device and method of sharing BIOS, so as to solve the problem in the prior art that it is time-consuming to execute the update procedure on each mainboard.

The server device of sharing BIOS provided by the present invention includes a plurality of mainboards, a circuit board, a memory unit, and a switching unit.

The circuit board is electrically connected to each mainboard. The memory unit and the switching unit are disposed on the circuit board.

Each mainboard has a respective model (also called a mainboard model). The memory unit stores a plurality of BIOS entity program segments, and each BIOS entity program segment corresponds to one mainboard model.

When the mainboard is booted, the switching unit transmits the BIOS entity program segment in the memory unit corresponding to the model of the mainboard intended for receiving the BIOS to the mainboard, thereby executing a boot program.

The switching unit may store a mapping table, which records mainboard models, storage addresses of BIOS entity program segments corresponding to various mainboard models in the memory unit, a mapping relationship between the motherboard models and the storage addresses. When the BIOS entity program segment is transmitted to the mainboard, the switching unit acquires a storage address according to the mapping table and the mainboard model, and then captures a corresponding BIOS entity program segment from the memory unit according to the acquired storage address and transmits it to the corresponding mainboard.

Further, a state unit is further disposed on the circuit board. The state unit may determine a use state of the BIOS entity program segment used by the mainboard and generate a selection signal according to the use state. The switching unit determines the mainboard intended for transmitting the BIOS entity program segment according to the selection signal.

Furthermore, a plurality of connection units is further disposed on the circuit board. The connection units may be respectively electrically connected to a mainboard. At this time, the state unit and the switching unit communicate with the mainboard through the connection units.

In an embodiment of the present invention, the state unit may include a register and a plurality of logic units.

The register is used to record the use state of the BIOS entity program segment used by the mainboard.

The logic units respectively generate a selection signal and a switching signal according to a booting signal sent by a mainboard and a record of the register. Herein, the switching signal is used to switch the record of the use state in the register.

When the mainboard does not use the BIOS entity program segment, the register outputs an idle signal to each logic unit. Furthermore, the logic units output the selection signal and the switching signal when receiving the booting signal and the idle signal. At this time, the switching signal may be based to switch the record of the use state in the register into the use state indicating that the mainboard uses the BIOS entity program segment.

In another aspect, each mainboard includes a power supply start-up unit and a chip set.

The power supply start-up unit is used to output a booting signal. The switching unit acquires the model of the mainboard having a chip set according to the chip set. The mainboard receives the BIOS entity program segment corresponding to the model of the mainboard having the chip set according to the chip set. The register acquires the use state of the BIOS entity program segment used by the mainboard having the chip set according to the chip set.

The chip set may include a General Purpose Input/Output (GPIO) and a serial peripheral interface control unit. The switching unit acquires the model of the mainboard having the chip set according to the GPIO. The register acquires the use state of the BIOS entity program segment used by the mainboard having the chip set according to the GPIO. The serial peripheral interface control unit is used to receive the BIOS entity program segment corresponding to the model of the mainboard having the chip set.

The method of sharing BIOS provided by the present invention includes acquiring a mainboard model of a mainboard intended for receiving a BIOS entity program segment, capturing a corresponding BIOS entity program segment from the memory unit according to the acquired mainboard model, and transmitting the captured BIOS entity program segment to the mainboard intended for receiving the BIOS.

The capturing step includes acquiring a storage address of the corresponding BIOS entity program segment from a mapping table recording the mainboard models, a plurality of storage addresses of the BIOS entity program segment in the memory unit, a mapping relationship between the mainboard models and the storage addresses according to the acquired mainboard model, and then capturing the corresponding BIOS entity program segment from the memory unit according to the storage address.

Furthermore, the method of sharing the BIOS further includes detecting the use state of the BIOS entity program segment used by the mainboard and determining the mainboard intended for transmitting the BIOS entity program segment according to the use state.

In view of the above, the server device and method of sharing BIOS provided by the present invention store a plurality of BIOS entity program segments in a centralizedly configured single memory unit and enable each mainboard to share the BIOS through the switching unit and the state unit, i.e., share a memory unit. In this way, when executing a BIOS update procedure, it is unnecessary to perform the update procedure for each mainboard, thereby saving time and enhancing efficiency. Furthermore, according to the architecture of the present invention, it is unnecessary to respectively configure the ROM for each mainboard in order to store the BIOS, thereby reducing the total number of elements, saving the cost, and reducing the power consumption.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

According to the server device and method of sharing BIOS provided by the present invention, the pedestal provides BIOS in a centralized management mode. In other words, the single memory unit storing the BIOS is disposed on the circuit board, and then is provided for each mainboard to use through a sharing mechanism.

Figure 1:
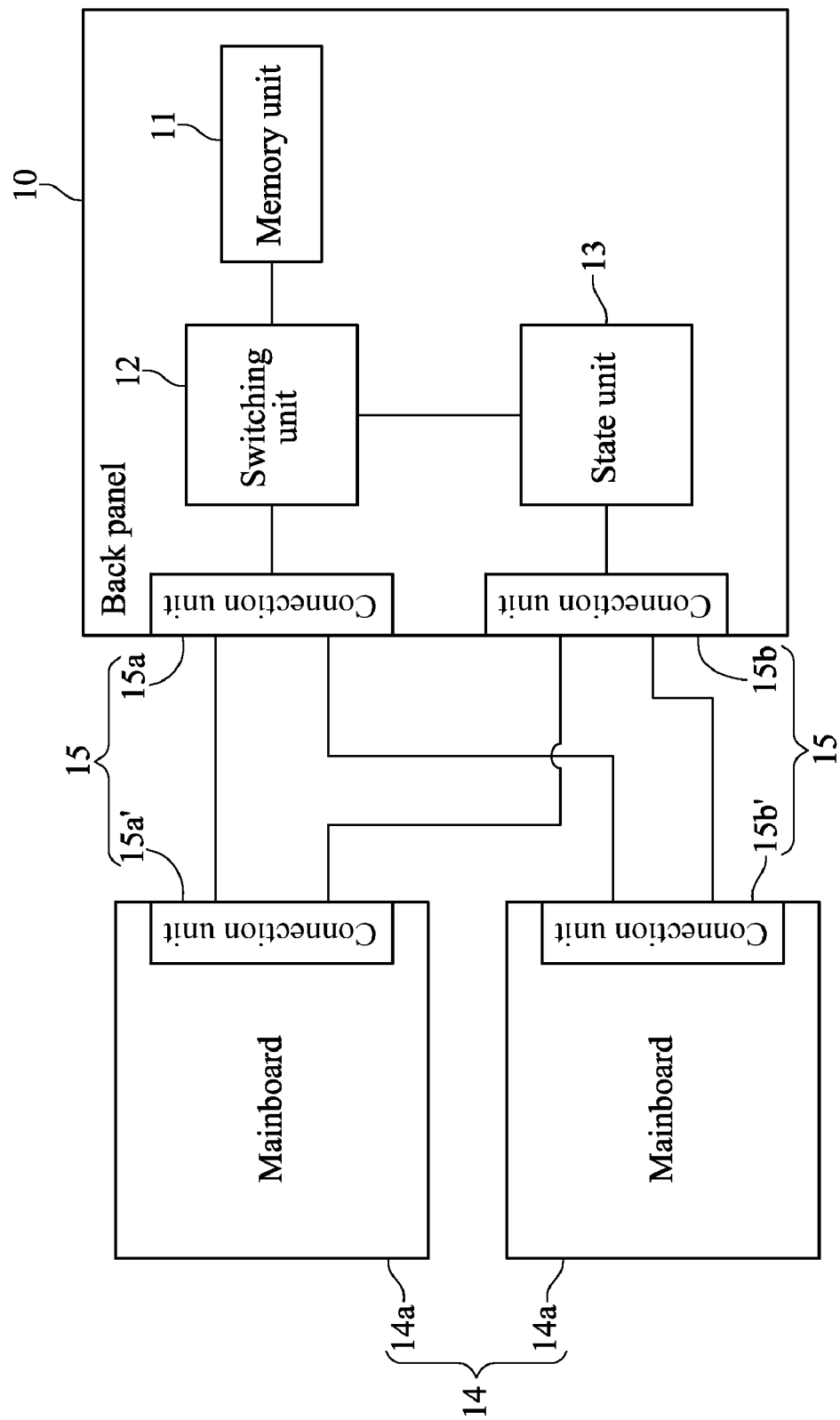
FIG. 1 is a block diagram of a server device of sharing BIOS according to an embodiment of the present invention.

FIG. 1 is a block diagram of a server device of sharing BIOS according to an embodiment of the present invention. As shown in FIG. 1, the server device of sharing BIOS includes a plurality of mainboards 14a and 14b (hereinafter generally called "the mainboard 14") and a single pedestal (not shown). The pedestal includes a circuit board (for example, a back panel 10), a memory unit 11, and a switching unit 12. For convenience of illustration, the circuit board is the back panel 10 for illustration.

The back panel 10 is electrically connected to each mainboard 14. The memory unit 11 and the switching unit 12 are disposed on the back panel 10.

Each mainboard 14 has a model (also called "mainboard model"). The memory unit 11 stores a plurality of BIOS entity program segments, and each BIOS entity program segment corresponds to one of the models.

For example, the memory unit 11 may store a plurality of BIOSes, and each BIOS corresponds to one mainboard model. The memory unit 11 may also store a single BIOS shared program segment and a plurality of BIOS entity program segments. Each BIOS entity program segment corresponds to one mainboard model. In other words, the BIOS shared program segment and one of the BIOS entity program segments constitute a BIOS corresponding to one mainboard model. In booting, the single BIOS shared program segment is provided for each mainboard to use sequentially. According to the corresponding mainboard model, the BIOS entity program segment is provided for the mainboard with the mainboard model to use.

The switching unit 12 transmits the BIOS entity program segment corresponding to the model of the mainboard 14 in the memory unit 11 intended for receiving the BIOS to one of the mainboards 14, i.e., acquires the BIOS entity program segment according to the model of the mainboard 14 intended for receiving the BIOS and transmits the BIOS entity program segment to the mainboard 14 intended for receiving the BIOS.

The switching unit 12 may store a mapping table, which records the mainboard models, a plurality of storage addresses of the BIOS entity program segments in the memory unit 11, and the mapping relationship between the mainboard models and the storage addresses according to the corresponding BIOS entity program segment. In addition, the switching unit 12 captures the BIOS entity program segment from the memory unit 11 according to the contents recorded in the mapping table and the model of the mainboard 14 intended for receiving the BIOS.

The server device of the BIOS in this embodiment further includes a state unit 13, which is disposed on the back panel 10.

The state unit 13 determines a use state of the BIOS entity program segment used by the mainboard 14 and generates a selection signal accordingly. The switching unit 12 further determines the mainboard 14 intended for transmitting the BIOS entity program segment according to the selection signal. The state unit 13 may output a selection signal when the mainboard does not use the BIOS entity program segment.

Furthermore, the server device of a BIOS in this embodiment further includes a plurality of connection units 15a, 15a', 15b, and 15b' (hereinafter generally called "the connection units 15").

The connection units 15 are disposed on the back panel 10 and the mainboard 14. The back panel 10 is electrically connected to one of the mainboards 14 through the connection units 15.

For example, the connection units 15a and 15b correspond to the connection units 15a' and 15b', respectively. The connection units 15a and 15b are disposed on the back panel 10, respectively, while the connection units 15a' and 15b' are disposed on the mainboard 14, respectively. The back panel 10 and the mainboard 14 are electrically connected to each other through the corresponding connection units 15a and 15a' or 15b and 15b'. For example, the mainboard 14a is coupled to the connection unit 15a on the back panel 10 by using the connection units 15a', while the mainboard 14b is coupled to the connection unit 15b on the back panel 10 by using the connection unit 15b'.

Herein, all the elements on the back panel 10 communicate with all the elements on the mainboard 14a (or 14b) through a corresponding group of connection units 15a and 15a' (or 15b and 15b'). That is, the state unit 13 and the switching unit 12 communicate with the mainboard 14a (of 14b) through the connection units 15a and 15a' (or 15b and 15b'). The corresponding connection units 15a and 15a' (15b and 15b') may be a slot or a golden finger interface, and the mainboard 14a (or 14b) is inserted into the corresponding slot in the back panel 10 via the golden finger interface, so as to form the communication between the mainboard 14 and the back panel 10. However, the corresponding connection units 15a and 15a' (or 15b and 15b') may also be two bus headers, so as to form communication between the mainboard 14 and the back panel 10 through the two headers connected by the bus.

Furthermore, the communication between the back panel 10 and a mainboard 14 is achieved by a group of the connection units 15, as well as two or more groups of the connection units 15.

Herein, the switching unit 12 and the state unit 13 may be optionally realized with a single processor. In other words, the functions of the switching unit 12 and the state unit 13 may be achieved by hardware elements, or firmware/software. The memory unit 11 may selectively use the ROM. However, the aforementioned description is merely used for illustration instead of limiting the present invention.

Figure 2:
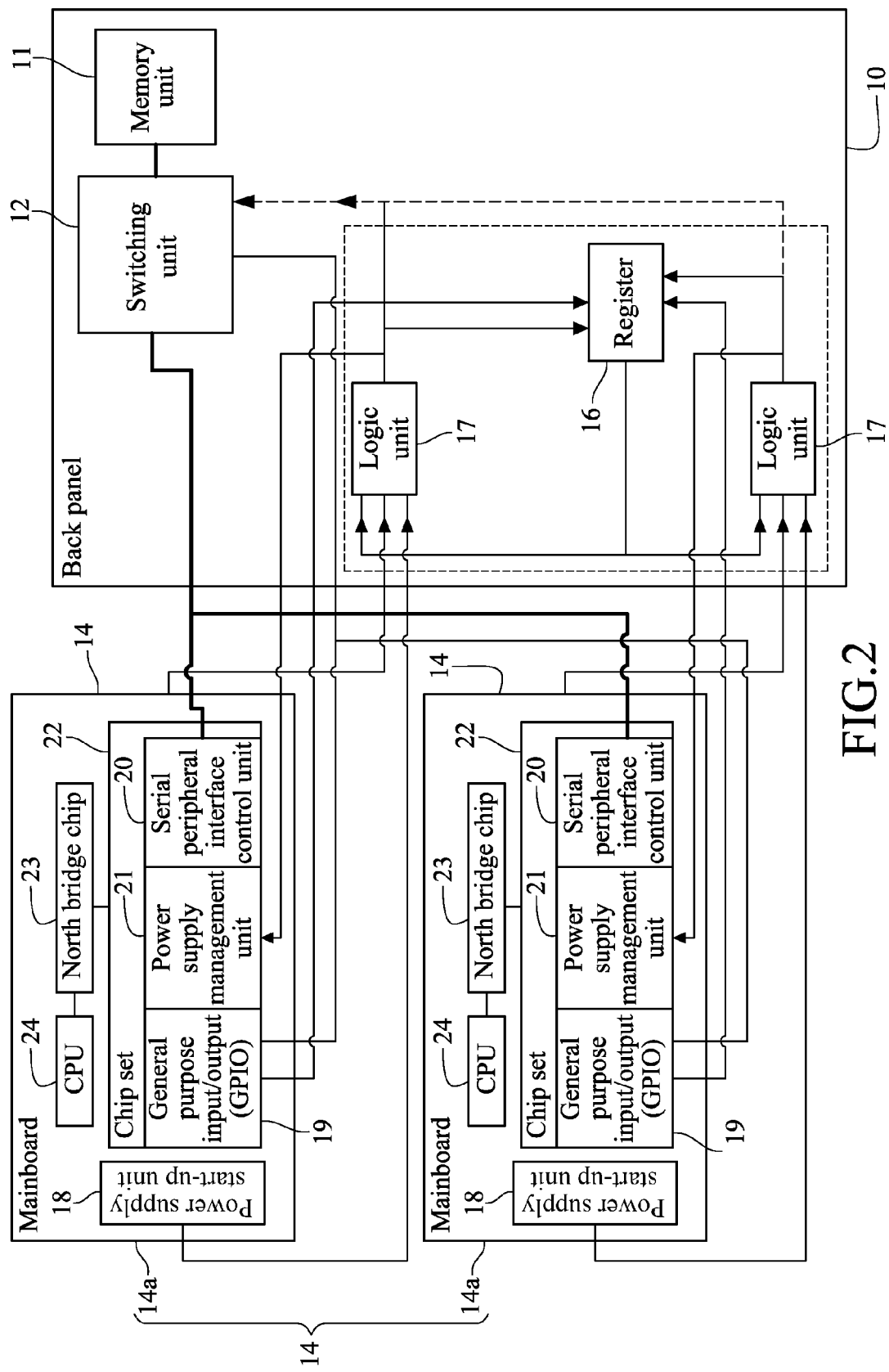
FIG. 2 is a block diagram of the server device of sharing BIOS according to an embodiment of the present invention.

FIG. 2 is a block diagram of a server device of sharing BIOS according to an embodiment of the present invention. As shown in FIG. 2, the server device of sharing BIOS includes a mainboard 14, a back panel 10, a memory unit 11, a switching unit 12, and a state unit 13. In this embodiment, the state unit 13 may include a register 16 and logic units 17. Each mainboard 14 includes a power supply start-up unit 18 and a chip set 22.

The register 16 is electrically connected to each logic unit 17 and the chip set 22. The logic units 17 are electrically connected to each mainboard 14, the power supply start-up unit 18, and the switching unit 12.

The register 16 records the use state of the BIOS entity program segment used by the mainboard 14. Each logic unit 17 generates a selection signal and a switching signal according to a booting signal emitted by one of the mainboards 14 and a record of the register 16, and the switching signal is used to switch the record of the register 16.

Herein, the logic units 17 may be an AND gate selectively, which is used for exemplary illustration.

When the mainboard 14 does not use the BIOS entity program segment, the register 16 outputs an idle signal to each logic unit 17, and further, the logic units 17 output a selection signal and a switching signal when receiving the booting signal and the idle signal.

The power supply start-up unit 18 outputs the booting signal. The switching unit 12 acquires the model of the mainboard 14 having a chip set 22 according to the chip set 22. The mainboard 14 acquires the BIOS entity program segment corresponding to the model of the mainboard 14 having the chip set 22 through the chip set 22. The register 16 acquires the use state of the BIOS entity program segment used by the mainboard 14 having the chip set 22 through the chip set 22.

The chip set 22 may include a GPIO 19, a serial peripheral interface control unit 20, and a power supply management unit 21.

The GPIO 19 is electrically connected to the switching unit 12 and the register 16. The serial peripheral interface control unit 20 is electrically connected to the switching unit 12. The power supply management unit 21 is electrically connected to the logic units 17.

The switching unit 12 acquires the model of the mainboard 14 having the chip set 22 through the GPIO 19. The register 16 acquires the use state of the BIOS entity program segment used by the mainboard 14 having the chip set 22 through the GPIO 19. The serial peripheral interface control unit 20 receives the BIOS entity program segment corresponding to the model of the mainboard 14 having the chip set 22. The power supply management unit 21 confirms whether the power supply of the mainboard 14 is started up.

In this embodiment, the chip set 22 may be a south bridge chip. The mainboard 14 further includes a north bridge chip 23 and a CPU 24, so as to execute computer instruction operation. The south bridge chip (i.e., the chip set 22) is electrically connected to the north bridge chip 23. The north bridge chip 23 is electrically connected to the CPU 24. Basically, the operating principles of the south bridge chip, the north bridge chip, and the CPU are well-known to those skilled in the art, and will not be described here. Furthermore, the south bridge chip and the north bridge chip may also be implemented by an integrated chip. However, the aforementioned description is merely used for illustration instead of limiting the implementation aspects of the present invention.

For example, if the mainboard 14a uses the BIOS entity program segment to execute the booting program, the use state of the BIOS entity program segment used by the mainboard 14a is a busy state, the register 16 records the use state of logic "1." If the mainboard 14a terminates the use of the BIOS entity program segment, the use state of the BIOS entity program segment used by the mainboard 14a is a non-busy state, and the register 16 records the state of logic "0" and outputs an idle signal of logic "0," which represents that the BIOS entity program segment can be used by any mainboard 14. When the mainboard 14b is inserted in the back panel 10, the logic unit 17 electrically connected to the mainboard 14b receives the idle signal of logic "0" from the register 16, and when receiving the booting signal of logic "1" outputted from the power supply start-up unit 18 of the mainboard 14b, the logic unit 17 electrically connected to the mainboard 14b outputs the selection signal with logic "1" and the switching signal of logic "1." According to the switching signal of logic "1," the record of the register 16 is switched into the use state of logic "1," so as to report that the use state of the BIOS entity program segment is a busy state. Furthermore, the switching unit 12 determines that the mainboard 14 intended for transmitting the BIOS entity program segment is the mainboard 14b according to the selection signal of logic "1" and captures the corresponding BIOS entity program segment from the memory unit 11 according to the model acquired through the GPIO 19 of the mainboard 14b, and then transmits it to the mainboard 14b, so as to execute the booting program. When the booting program has been executed, the GPIO 19 of the mainboard 14b further outputs the switching signal of logic "0" to the register 16, so that the record of the register 16 is switched to the use state of logic "0", so as to acquire that the BIOS entity program segment is in a non-busy state.

Figure 3:
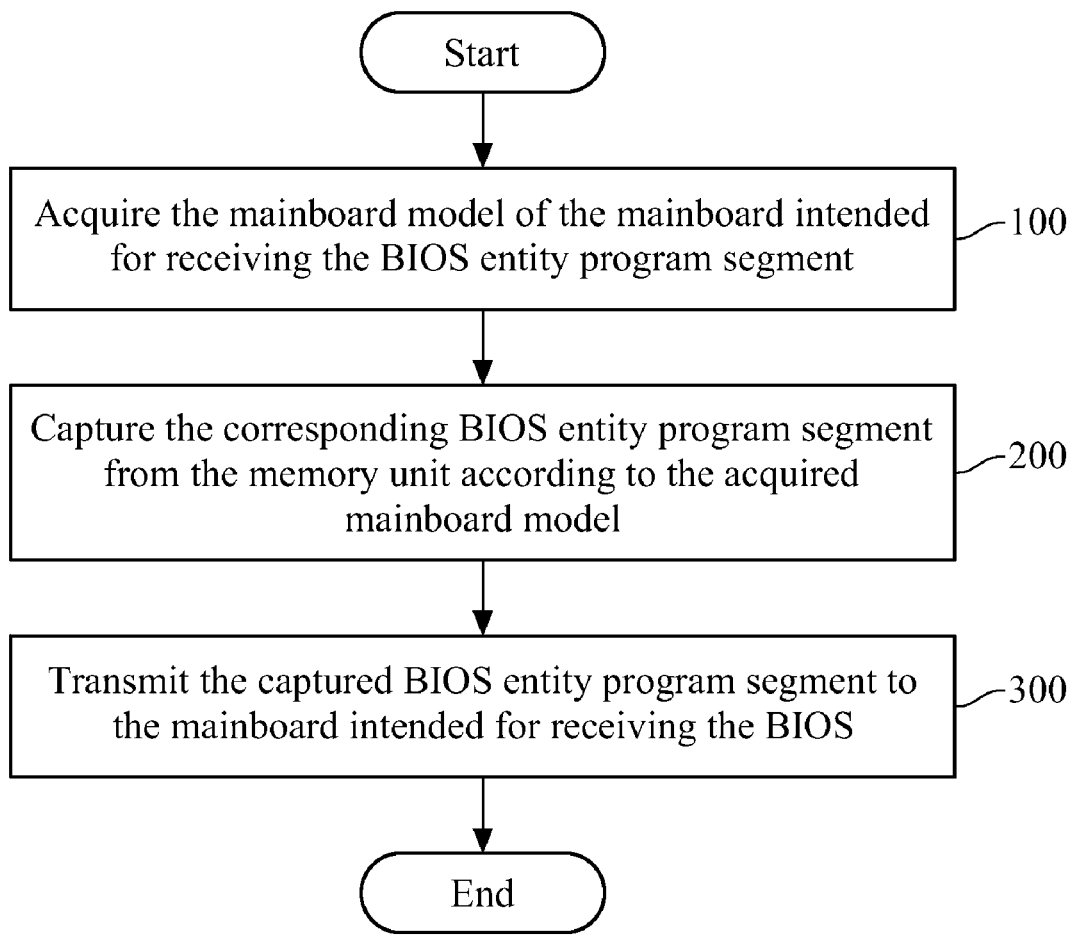
FIG. 3 is a flow chart of processes of a method of sharing BIOS according to an embodiment of the present invention.

FIG. 3 is a flow chart of the method of sharing BIOS according to an embodiment of the present invention. As shown in FIG. 3, the method of sharing BIOS is applied in a back panel 10 of a server device (as shown in FIG. 1). The server device further includes a plurality of mainboards 14a and 14b (hereinafter generally called "the mainboard 14"). The back panel 10 has a memory unit 11. The memory unit 11 stores a plurality of BIOS entity program segment corresponding to one mainboard model.

Herein, the mainboard model of the mainboard 14 intended for receiving the BIOS entity program segment is acquired (Step 100).

Then, the corresponding BIOS entity program segment is captured from the memory unit 11 according to the acquired mainboard model (Step 200).

Then, the captured BIOS entity program segment is transmitted to the mainboard 14 intended for receiving the BIOS (Step 300).

Figure 4:
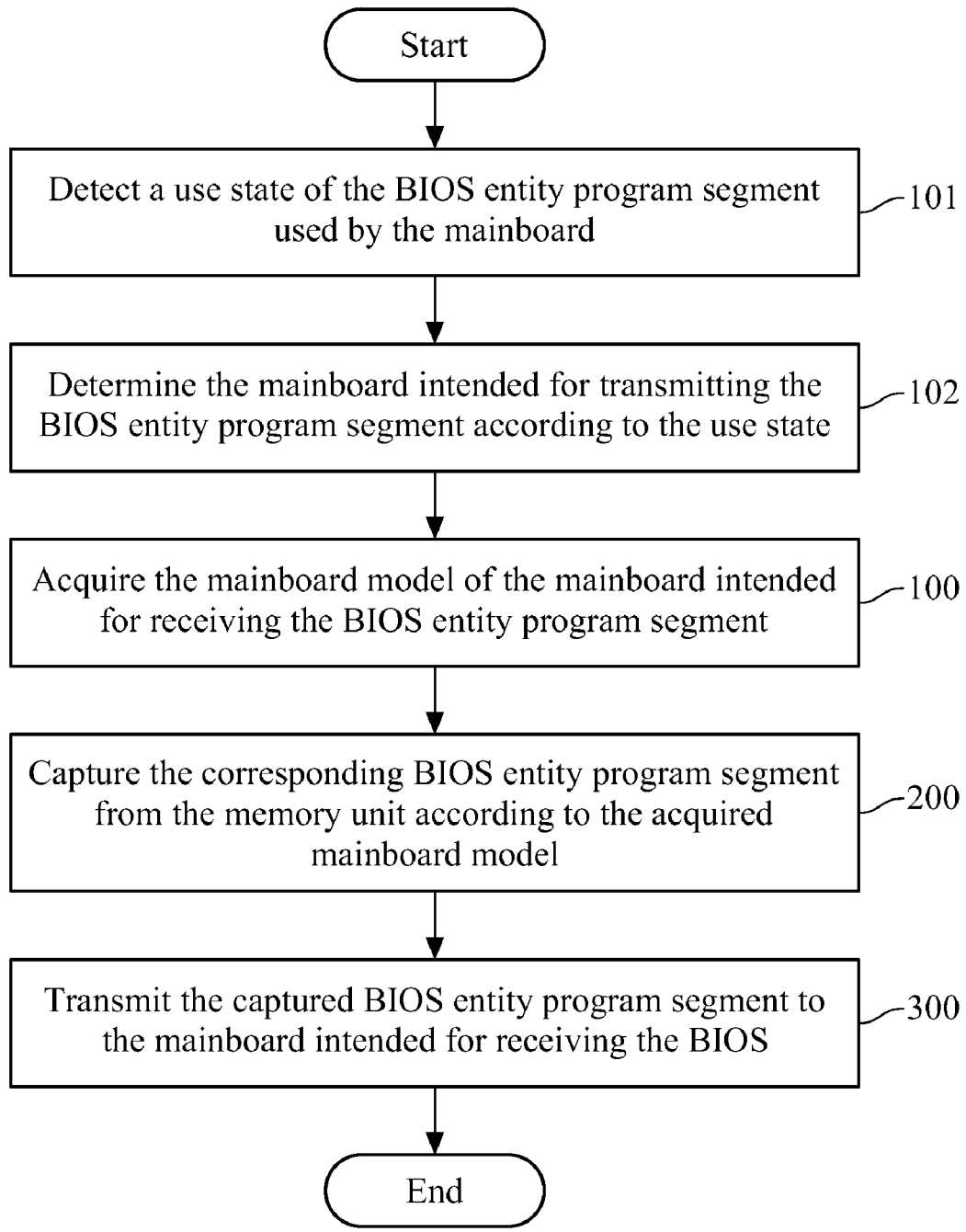
FIG. 4 is a flow chart of processes of the method of sharing BIOS according to an embodiment of the present invention.

Referring to FIG. 4, in a detection step (Step 101) and a determination step (Step 102), the mainboard 14 intended for transmitting the BIOS entity program segment is acquired.

As shown in FIG. 4, first, a use state of the BIOS entity program segment used by the mainboard 14 is detected (Step 101), and the mainboard 14 intended for transmitting the BIOS entity program segment is determined according to the use state (Step 102).

Figure 5:
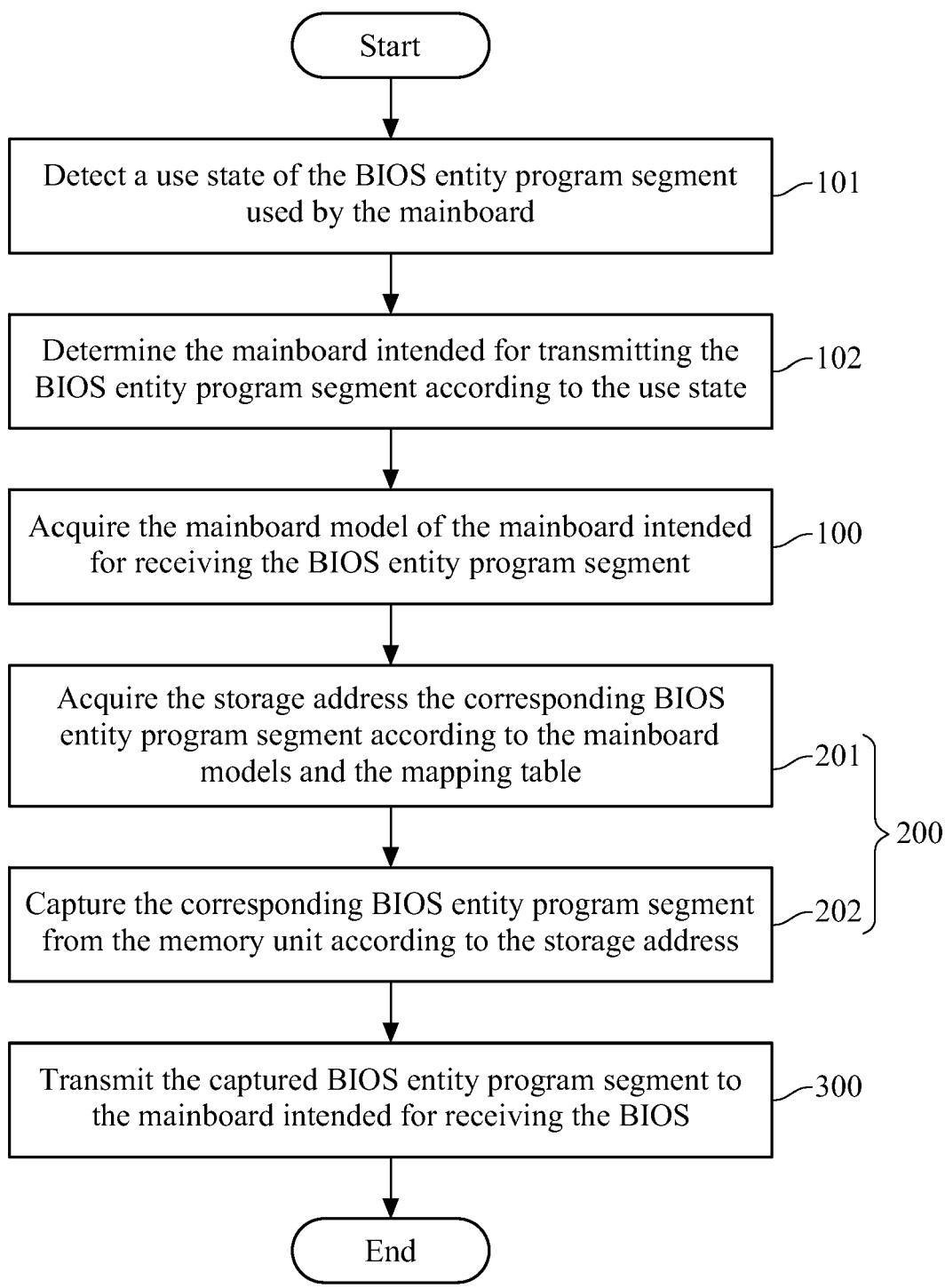
FIG. 5 is a flow chart of processes of sharing BIOS according to an embodiment of the present invention.

Herein, the capturing step may be achieved through a mapping table, which records the mainboard models, a plurality of storage addresses of the BIOS entity program segments in the memory unit 11, and the mapping relationship between the mainboard models and the storage addresses according to the corresponding BIOS entity program segments. Referring to FIG. 5, after acquiring the mainboard model of the mainboard 14 intended for receiving the BIOS entity program segment, the storage address of the corresponding BIOS entity program segment is acquired from the mapping table according to the acquired mainboard model (Step 201), and then the corresponding BIOS entity program segment is captured from the memory unit 11 according to the storage addresses (Step 202).

For example, when the mainboard 14 is inserted into the back panel 10, the user presses a start-up switch of the mainboard 14 (i.e., touch the power supply start-up unit 18), so as to enable the mainboard 14 to output the booting signal of the logic "1" to the logic units 17 which are electrically connected thereto. When the logic units 17 receive the booting signal of the logic "1" and the idle signal of the logic "0" outputted from the register 16, the logic units 17 output the switching signal of the logic "1" to the register 16 to switch the record of the register 16, so that the record of the register 16 is a busy state of the logic "1" (i.e., a use state). Meanwhile, the logic units 17 output the selection signal of the logic "1" to the switching unit 12. Furthermore, the switching unit 12 obtains the mainboard model when the GPIO 19 of the mainboard 14 transmits the mainboard model to it, i.e., the mainboard model of the mainboard 14 intended for receiving the BIOS entity program segment. Moreover, the switching unit 12 captures the corresponding BIOS entity program segment from the memory unit 11 according to the acquired mainboard model, and then transmits the captured BIOS entity program segment to the mainboard 14 intended for receiving the BIOS. When the mainboard 14 has executed the booting program of the corresponding BIOS entity program segment, the GPIO 19 of the mainboard 14 will output the switching signal of the logic "0," so that the register 16 terminates the use of the BIOS entity program segment, and the record of the register 16 is switched back to an idle state of the logic "0" (i.e., another use state), thereby acquiring that the BIOS entity program segment is in a non-busy state, enabling other mainboards 14 to execute the booting programs, and then completing the execution of the booting programs of all mainboards 14. In such a way, the BIOS may be shared.

In view of the above, the server device and method of sharing BIOS provided by the present invention store a plurality of BIOS entity program segments respectively corresponding to one mainboard model in a single memory unit and transmit the BIOS entity program segment corresponding to the model of the mainboard intended for receiving the BIOS to the mainboard through the switching unit, so that the mainboards of various models may share the BIOS.

What is claimed is:

1. A multiple-server device with a shared Basic Input/Output System (BIOS), comprising:
    a plurality of mainboards, each having a model;
    a circuit board electrically connected to the mainboards;
    a memory unit disposed on the circuit board to store a plurality of BIOS entity program segments, each of the BIOS entity program segments corresponding to one of the models; and
    a switching unit, disposed on the circuit board, configured to retrieve from the memory unit and transmit to each mainboard the BIOS entity program segment corresponding to the model of the mainboard;
    a state unit, disposed on the circuit board to determine a use state of the BIOS entity program segment used by the mainboard, so as to generate a selection signal;
    wherein the switching unit determines the mainboard intended for transmitting the BIOS entity program segment according to the selection signal;
    a register, for recording the use state of the BIOS entity program segment used by the mainboard; and
    a plurality of logic units, each generating a selection signal and a switching signal according to a booting signal emitted by one of the mainboards and a record of the register, wherein the switching signal is used to switch the record of the register;
    wherein when the mainboard does not use the BIOS entity program segment, the register outputs an idle signal to each of the logic units, and the logic unit outputs the selection signal and the switching signal when receiving the booting signal and the idle signal.

2. The multiple-server according to claim 1, wherein each of the mainboards comprises:
    a power supply start-up unit, for outputting the booting signal; and
    a chip set, wherein the switching unit acquires the model of the mainboard having the chip set according to the chip set, the mainboard receives the BIOS entity program segment corresponding to the model of the mainboard having the chip set through the chip set, and the register acquires the use state of the BIOS entity program segment used by the mainboard having the chip set through the chip set.

3. The multiple server device according to claim 2, wherein each of the chip sets comprises:
a General Purpose Input/Output (GPIO) port, wherein the switching unit acquires the model of the mainboard having the chip set through the GPIO, and the register acquires the use state of the BIOS entity program segment used by the mainboard having the chip set through the GPIO; and
a serial peripheral interface control unit, for receiving the BIOS entity program segment corresponding to the model of the mainboard having the chip set.

4. A method of booting up a plurality of mainboards from one or more BIOS programs stored on a memory associated with a circuit board connected to the mainboards, the method comprising:
starting up one or more of the mainboards;
each started-up mainboard, before booting up, communicating a signal to the circuit board indicating that the mainboard has started up;
providing a mapping table mapping a plurality of mainboard models to a plurality of storage addresses of corresponding BIOS programs;
the circuit board retrieving a BIOS program from the memory appropriate to each started-up mainboard from a memory associated with the circuit board;
each started-up mainboard acquiring the appropriate BIOS program from the circuit board; and
each started-up mainboard booting itself up with the acquired BIOS program.

5. The method according to claim 4, further comprising:
the circuit board detecting and recording use states of each of the connected mainboards indicating whether the mainboard is executing a BIOS program; and
the circuit board determining when to transmit a BIOS program according to the use states.

6. The method according to claim 4, further comprising:
each started-up mainboard communicating information indicating a model of the mainboard to the circuit board; and
the circuit board using the model-indicating information to select an appropriate BIOS program for each started-up mainboard.

7. The method according to claim 4, further comprising:
the circuit board detecting and recording use states of each of the connected mainboards indicating whether the mainboard is executing a BIOS program; and
the circuit board determining when to transmit a BIOS program according to the use states.

8. A device for sharing a Basic Input/Output System (BIOS) with multiple servers on multiple mainboards, the device comprising:
a circuit board connected to each of the mainboards, the circuit board receiving a signal from each of the mainboards indicating whether the mainboard is being started up; and
a memory coupled to the circuit board, the memory storing one or more BIOS programs;
wherein the circuit board is configured to respond to a signal indicating that a mainboard is being started up by supplying the corresponding mainboard with a BIOS program from the memory that is appropriate for the mainboard;
wherein the circuit board includes a logic unit for each and every connected mainboard, each logic unit receiving the signal indicating whether the corresponding mainboard is being started up and a second signal indicating whether any of the mainboards are busy executing a BIOS program and outputting a third signal to provide a BIOS program to the corresponding mainboard if it is starting up and the other mainboards are not executing BIOS programs.

9. The device of claim 8, wherein the circuit board is further configured to detect whether a first mainboard is executing a BIOS program, and to delay supplying a second mainboard with a BIOS program until the first mainboard is finished executing the BIOS program.

10. The device of claim 8, wherein the circuit board is further configured to record use states of each of the connected mainboards indicating whether the mainboard is executing a BIOS program.

11. The device of claim 8,
wherein the memory stores multiple BIOS programs corresponding to multiple mainboard model numbers; and
the circuit board is configured to acquire a model number of a mainboard and to select a BIOS program from the memory that corresponds to the model number.

12. The device of claim 8, wherein the circuit board is configured to supply the BIOS program to a connected mainboard through a serial interface of the mainboard.

13. The device of claim 8, further comprising a pedestal that supplies power and network communications to each of the mainboards, with the circuit board being disposed on the pedestal.

* * * * *